US008547862B2

(12) United States Patent
Bahl et al.

(10) Patent No.: US 8,547,862 B2
(45) Date of Patent: Oct. 1, 2013

(54) INTEGRATING WHITE SPACE SUPPORT INTO A NETWORK STACK

(75) Inventors: Paramvir Bahl, Bellevue, WA (US); Ranveer Chandra, Kirkland, WA (US); Thomas Moscibroda, Redmond, WA (US); Xiaohui Wang, Pittsburg, PA (US)

(73) Assignee: Microsoft Corporation, Redmond, WA (US)

( * ) Notice: Subject to any disclaimer, the term of this patent is extended or adjusted under 35 U.S.C. 154(b) by 456 days.

(21) Appl. No.: 12/822,209

(22) Filed: Jun. 24, 2010

(65) Prior Publication Data

US 2011/0317632 A1 Dec. 29, 2011

(51) Int. Cl.
*G01R 31/18* (2006.01)

(52) U.S. Cl.
USPC .......................................... 370/252; 370/329

(58) Field of Classification Search
CPC ... H04W 88/06; H04W 84/045; H04W 92/02; H04W 36/14; H04W 12/06
USPC ................................................. 370/252, 329
See application file for complete search history.

(56) References Cited

U.S. PATENT DOCUMENTS

| | | | | |
|---|---|---|---|---|
| 7,933,598 | B1 * | 4/2011 | Agrawal et al. ............... | 455/436 |
| 2008/0130519 | A1 * | 6/2008 | Bahl et al. ..................... | 370/254 |
| 2009/0034457 | A1 | 2/2009 | Bahl et al. | |
| 2009/0196180 | A1 * | 8/2009 | Bahl et al. ..................... | 370/235 |
| 2009/0197627 | A1 | 8/2009 | Kuffner et al. | |
| 2009/0204725 | A1 * | 8/2009 | Liu et al. ....................... | 709/246 |
| 2011/0116458 | A1 * | 5/2011 | Hsu et al. ...................... | 370/329 |
| 2011/0122855 | A1 * | 5/2011 | Henry ............................ | 370/338 |
| 2011/0188486 | A1 * | 8/2011 | Kim et al. ..................... | 370/338 |
| 2011/0228666 | A1 * | 9/2011 | Barbieri et al. ............... | 370/216 |

OTHER PUBLICATIONS

Nekovee, Maziar., "Quantifying the TV White Spaces Spectrum Opportunity for Cognitive Radio Access", Retrieved at << www. springerlink.com/index/p1hrw58u75027542.pdf >>, First International ICST Conference, EuropeComm, Aug. 11-13, 2009, pp. 46-57.

(Continued)

*Primary Examiner* — Jung Park
(74) *Attorney, Agent, or Firm* — Gonzalez Saggio & Harlan LLP

(57) ABSTRACT

Described is incorporating white space networking components into a network stack. A user mode spectrum access control component determines which white space channels are currently allowed for use based upon policy, current operating status and availability information obtained from one or more sources. A white space service (e.g., in the WLAN service) receives the availability information. The white space service includes a discovery module that discovers other nodes, and a channel migration module that changes from the current channel to another channel if the current channel is no longer allowed for use. A kernel mode (NDIS layer) white space driver through a miniport driver controls the channel in use as the current channel. An automatic configuration module is provided that switches to Wi-Fi network communication when a Wi-Fi network is present, and switches back when a Wi-Fi network is not present.

19 Claims, 5 Drawing Sheets

(56) References Cited

OTHER PUBLICATIONS

Bahl, et al., "White Space Networking with Wi-Fi like Connectivity", Retrieved at << www.eecs.harvard.edu/~mdw/papers/whitefi-sigcomm09.pdf >>, ACM SIGCOMM Computer Communication Review, vol. 39, No. 4, SIGCOMM '09, Oct. 2009, pp. 12.

Yuan, et al., "KNOWS: Kognitiv Networking Over White Spaces", Retrieved at << http://citeseerx.ist.psu.edu/viewdoc/download?doi=10.1.1.123.4056&rep=rep1&type=pdf >>, IEEE Dynamic Spectrum Access Networks (DySPAN), Apr. 2007, pp. 12.

Stirling, Andrew., "White Spaces—the New Wi-Fi?", Retrieved at << http://www.intellectbooks.co.uk/File:download,id=761/JDTV.1.1.69.pdf >>, International Journal of Digital Television, vol. 1, No. 1, 2010, pp. 16.

* cited by examiner

INTEGRATING WHITE SPACE SUPPORT INTO A NETWORK STACK

BACKGROUND

In the radio frequency spectrum, "white spaces" refer to unoccupied television channels. One technology that is likely to benefit from white space availability is wireless networking based upon white spaces. In particular, wireless networks may significantly benefit from the propagation (long range) and building penetration properties of VHF and UHF bands compared to other unlicensed spectrum bands like the 2.4 or 5 GHz ISM bands.

In the United States, the Federal Communications Commission (FCC) is allowing unlicensed devices to opportunistically operate in white spaces in the UHF and VHF bands. Other countries are considering similar regulations. However any such operation of an unlicensed device is (or will be) subject to meeting governmental regulations. For example, the FCC permits unlicensed devices to transmit in white spaces as long as they do not interfere with the primary licensed users of this spectrum, namely television broadcasters and licensed wireless microphones.

In view of these regulations, the current Wi-Fi network stack cannot be used "as is" to also support white space networks.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which white space networking is facilitated by various network stack components, such as by including components in the WLAN network stack that handles Wi-Fi networking. Among other benefits, the components are arranged in an architecture that allows for extensibility, and provides for seamless switching between Wi-Fi networking and white space networking, e.g., depending on current Wi-Fi characteristics.

In one implementation, a user mode spectrum access control component determines which white space channels are currently allowed for use ("available") based upon policy, (e.g., including per country international policy), current operating status and availability information obtained from one or more sources via availability modules. Example sources include geo-location database which is accessed via a query database availability module, another device that is accessed by a spectrum sharing availability module, and/or sensed signals that indicate a licensed user is using a channel, which is communicated up to a sensing/scanning availability module.

The availability information is passed through a user mode wireless LAN (WLAN) service that includes a white space service. The white space service includes various modules that provide white space networking, including a discovery module that discovers other nodes for white space communication, and a channel migration module that changes from the current channel to another channel if the current channel is no longer allowed for use. For example, before there is a need for migrating, a list of other channels may be negotiated with another white space device, so as to determine the next other channel (a backup channel) in advance so as to facilitate rapid migration if the channel in use becomes unavailable.

A kernel mode (NDIS layer) white space driver controls the frequency and/or bandwidth corresponding to the channel in use as the current channel, based upon information received from the white space service. For example, the white space driver communicates with an underlying miniport driver coupled to the networking hardware.

The white space driver may be configured with a spectrum sensing module that (via underlying signal sensing hardware, frequently called a 'scanner') detects when the current white space channel is no longer allowed for use, and communicates corresponding information to the white space service so that the device can migrate to another channel. The white space service also may include a spectrum sharing module for communicating information to other devices to indicate that a current white space channel is no longer allowed for use.

In one aspect, an automatic configuration module is provided that switches to Wi-Fi network communication when a Wi-Fi network is present, and switches to white space network communication when a Wi-Fi network is not present. This can be done in a seamless way, without causing any interruption to higher layer protocols and applications.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
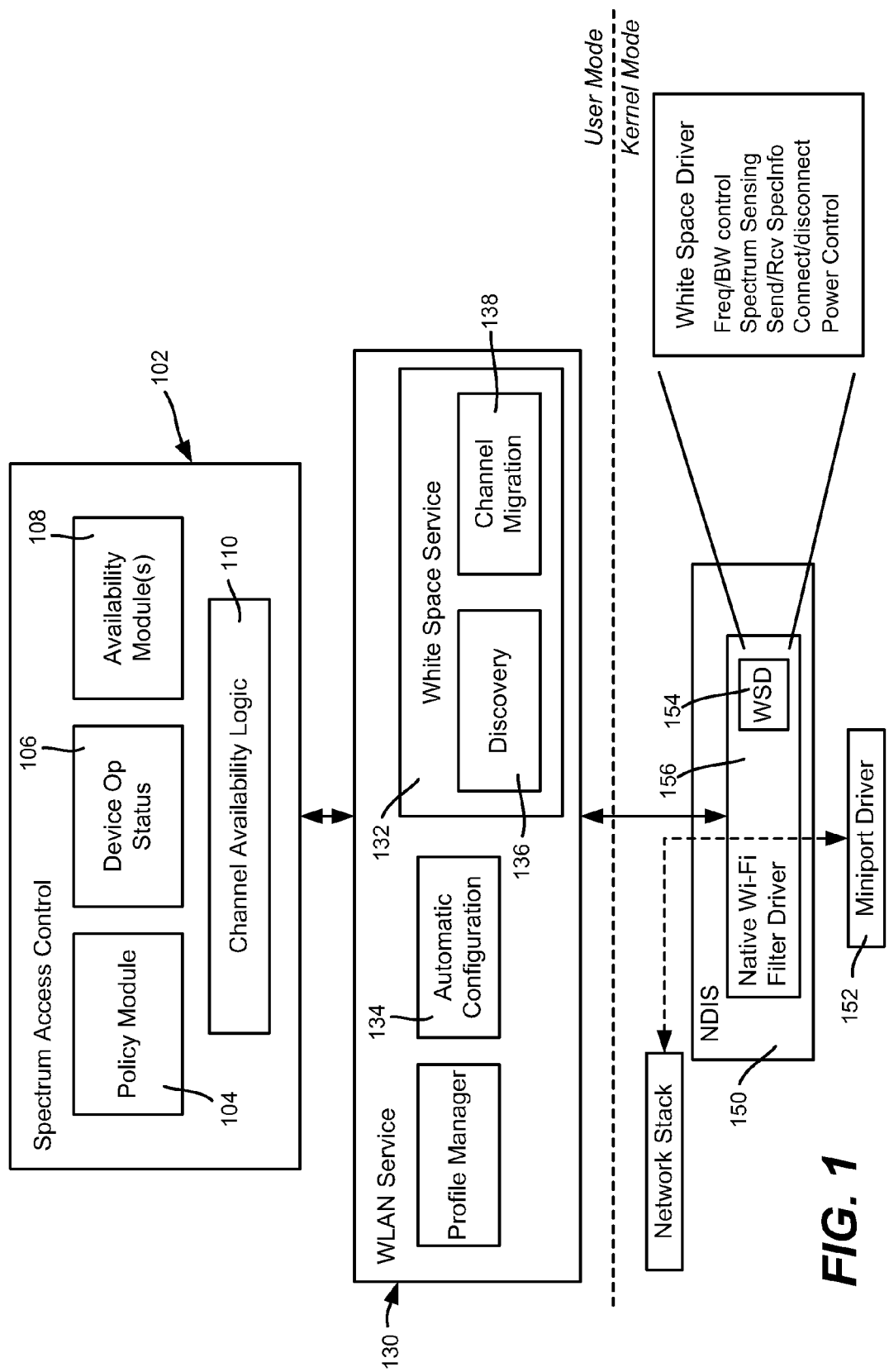
FIG. 1 is a block diagram representing various user mode and kernel mode components integrated into a network stack to provide white space networking.

Various aspects of the technology described herein are generally directed towards a network stack configured to support white space networks in an efficient and seamless way. For example, the white space network stack supports mechanisms to quickly and efficiently check the spectrum availability using any allowed or mandated methods prescribed by the FCC or other country-specific regulating body. Note that such availability changes, e.g., as a wireless microphone becomes plugged in, or a device travels to a new location in which a (previously out-of-range) television station is operating.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and data transmission in general.

FIGS. 1-4 are block diagrams generally showing user mode and kernel mode components in a computing device or the like for implementing Wi-Fi and white space networking, including within a network stack architecture. In general, a spectrum access control component 102 in the user mode includes a policy module 104, a device operating (op) status module 106, one or more availability modules 108, and channel availability logic 110 or the like.

Figure 2:
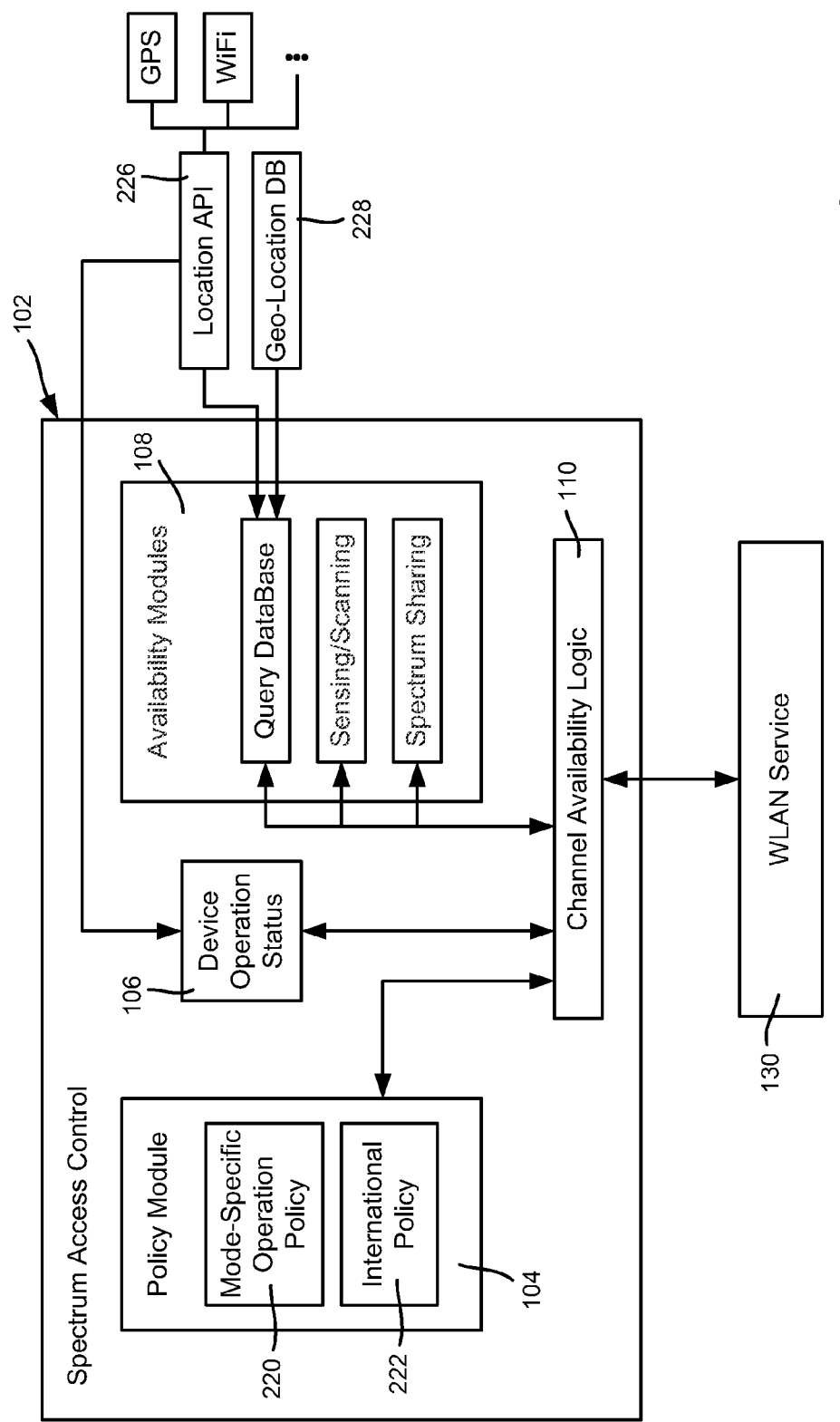
FIG. 2 is a block diagram representing spectrum access control components integrated into the network stack to determine allowed channels for white space networking.

As shown in more detail in FIG. 2, in the policy module 104, an international policy component 220 may be present, which facilitates seamlessly integrating international policies into the computing device, and quickly and efficiently adapting to them, on demand. In general, the international policy component 220 comprises a set of rules, in any suitable schema (e.g., XML), which apply to the country in which the device is currently operating. A device may have any number of such schema, such as one per country that allows white space networking; a device is not able to operate as a white space device in a country for which it does not have the rules or there are no rules, e.g., white space networking is not allowed. Frequency, power, sensing (or not) all may be regulated along with other considerations. If a country decides to change its regulations, a white space device using the described white space networking stack may simply exchange the corresponding schema in the policy module 104.

The policy module 104 also may include a mode-specific operation policy component 222, which depends on the mode in which the device is operating (as provided by its device operation status module 106) as well as its current capabilities. By way of example, a device may be mobile or fixed, may be a master or slave device, may or may not currently have an Internet connection, may or may not currently have access to peers and so forth. A location API 226 or the like may provide the device operating status module 106 with its current location information, when available, which may be obtained via GPS, Wi-Fi, and so forth; (note that a device may not have knowledge of its current location information).

For example, a first mode may correspond to a device that knows its current geo-location/position, and has access to a geo-location database 228 (e.g., via access to the internet) so that it can determine from the database what channels are currently available. Another mode corresponds to a device that knows its geo-location, has no internet access, but is able to contact another device that does have internet access and obtain information from that other device. Still another mode corresponds to a device that knows its geo-location by has no direct or indirect access to the Internet; to comply with policy, such a device needs to sense the spectrum to determine whether it can operate as a white space device, if allowed by the current policy.

By way of example of mode-specific rules, a policy rule in a certain country may state that a device needs to have both database access and sensing (to some low-level threshold) to use some channel for white space networking. If the device does not have sensing capabilities at that level, then even if that channel is available according to the database, and regardless of its actual availability, that channel is considered as not actually available.

The device includes one or more availability modules 108, such as those shown in FIG. 2, although more or less may be present. The availability modules provide the various mechanisms to check whether a channel is available or not, e.g., via geo-location database access, via sensing/scanning, and/or through spectrum data sharing with other neighbor devices, e.g., coupled over a wired or wireless intranet connection, Bluetooth® connection, infrared connection and so forth.

The channel availability logic 110 considers the current device operating status and the information provided by the availability modules against the current policy. The channel availability logic 110 then computes a list or the like of which white space channels, if any, are currently allowed for use by the device, or more generally, which white-spaces are available. Note that depending on the policy regulations, it may be possible to use some part of a channel, if only another part within a channel is actually blocked. In such a scenario, the availability logic considers which part of the white-space spectrum is available, and under what conditions/settings a device is allowed to transmit on each of these channels, e.g., the transmission power, encoding schemes, MAC protocol and so forth; (for example a device may be allowed transmit on channel A with a transmit power of P_A, and on channel B only with a smaller transmit power P_B). Further note that the modular configuration allows the device to add new spectrum availability modules on demand, as such modules may be needed. The rules and the like may specify how often the database needs to be accessed or a peer contacted for the availability information, for example.

The channel availability information is provided to a WLAN service 130 that has been configured with a white space service 132. In one implementation, the white space network stack provides for seamless integration of Wi-Fi and white space networking. To this end, the WLAN service 130 includes a Wi-Fi/white space automatic configuration module 134, which algorithmically decides when to provide connectivity using Wi-Fi technology, and when to switch to white space networking, (and vice-versa). In one implementation, the automatic configuration module 134 directs the device to operate in Wi-Fi (which has lower range, but may have higher throughput) whenever such Wi-Fi connectivity is available, and seamlessly transitions to white space networking only when the device is out of range of Wi-Fi. Some time and/or signal strength thresholds may be used, so as to not switch back and forth unnecessarily, e.g., if a device only briefly or intermittently has Wi-Fi access.

Discovery of other white space devices occurs via the discovery module 136, and takes place in a rapid, known manner (such as described in published U.S. patent application Nos. 20060116148 and 20040204071). A connection may then be established until disconnected.

Connection/disconnection are straightforward operations in Wi-Fi, because in Wi-Fi networks every device is allowed to use the entire Wi-Fi spectrum. In contrast, in white space networks, certain parts of the spectrum on which a device may be operating suddenly may become unavailable, forcing the device to switch the channel. A channel migration module 138 provides support for this functionality.

To this end, the channel migration module 138 allows the white space device to quickly and seamlessly change the white space channel, in case it has to vacate the channel (for example when a wireless microphone shows up). In one implementation, while communicating with another white space device (e.g., access point), the devices may negotiate a list or the like of the channels that can be switched to in the event that the current channel becomes unavailable. Note that the negotiation is used because in white space networks, the spectrum may be fragmented, and spectrum parts of different sizes may be available, making the discovery procedure more difficult. A rapid "switch now" command or the like may be sent, (or communication may suddenly halt on that channel) whereby the devices switch to the next channel on their list, for example. The stack implementation described herein thus handles fast channel migration, (unlike Wi-Fi networks in which channels do not become unavailable and thus fast channel migration is not needed).

Turning to the kernel mode components, a network API 350 (FIG. 3, e.g., the well known NDIS layer 150 in FIG. 1) that provides an API set to the miniport driver 152 for the hardware includes a white space driver, e.g., a driver 154 incorporated into the native Wi-Fi filter driver 156. Note that NDIS is only one example implementation, and the network stack described herein may be generic across various platforms. The white space driver allows controlling the hardware, such as for frequency, bandwidth and power control, as well as for the communication of information with the other white space devices.

Figure 3:
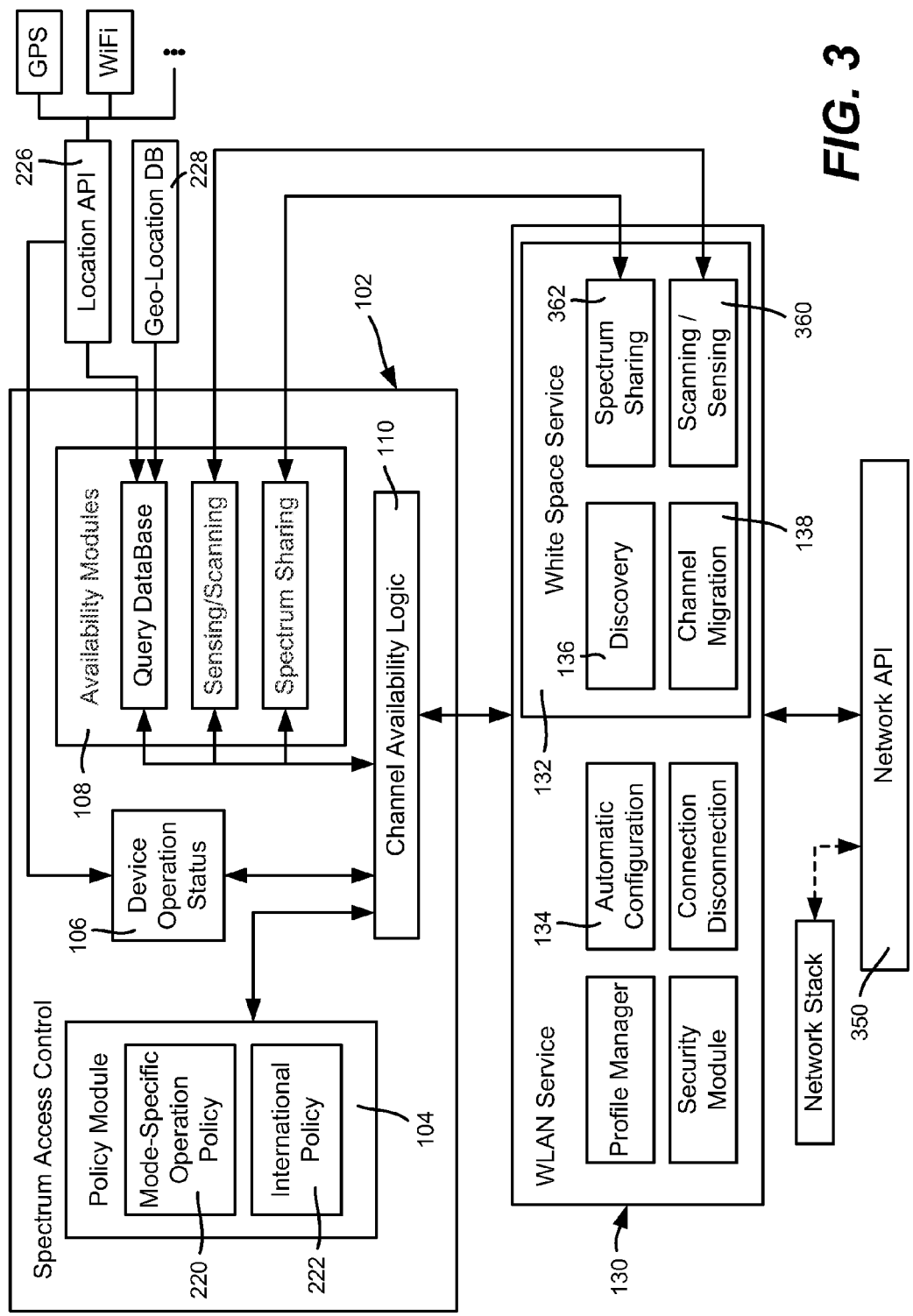
FIG. 3 is a block diagram representing the network stack including modules of a white space service to determine and select among channels for white space networking.
Figure 4:
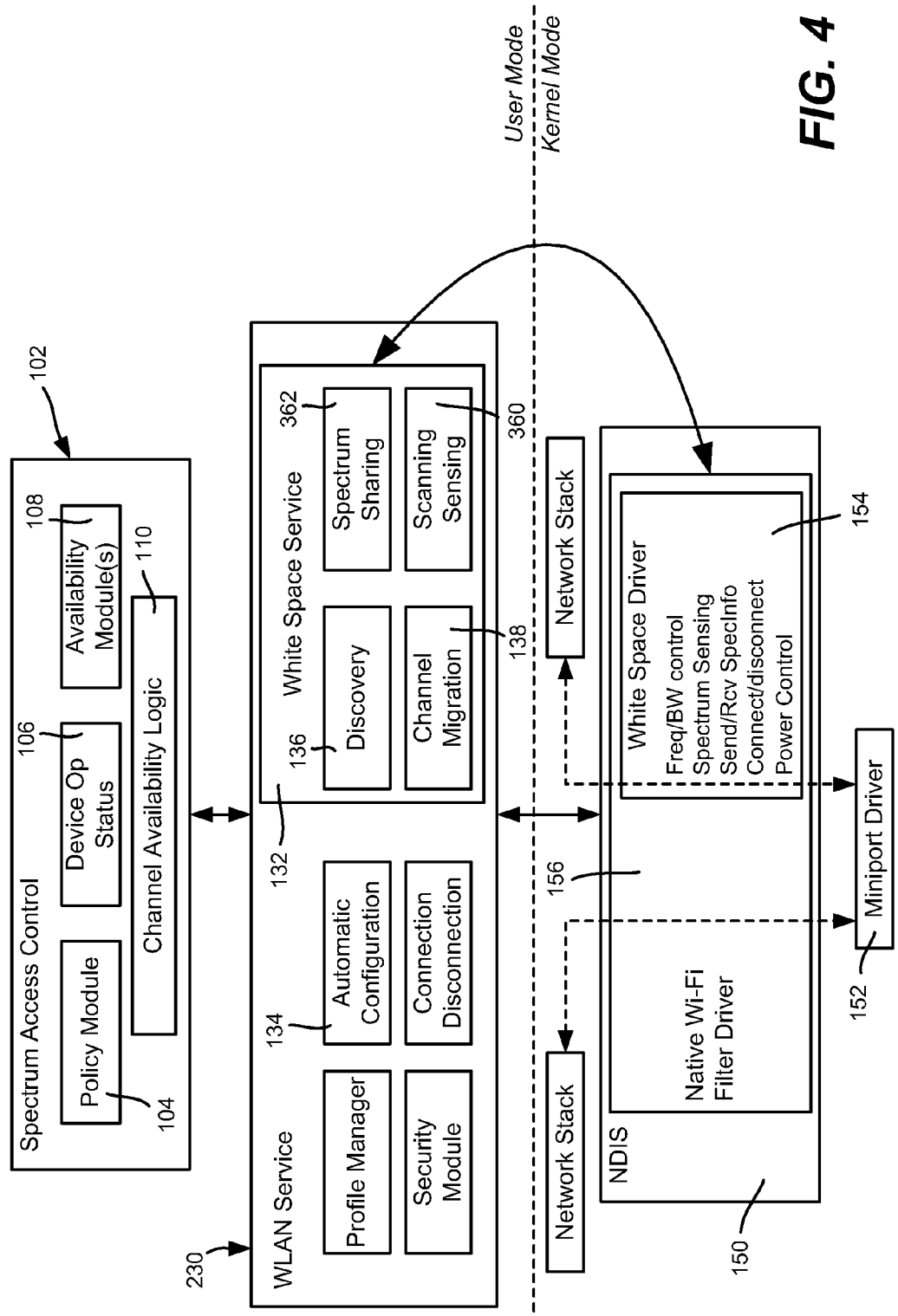
FIG. 4 is a block diagram representing various user mode and kernel mode components, including a white space driver incorporated into an NDIS layer kernel mode component.

As represented in FIGS. 3 and 4, scanning and sensing data (for devices having such capability) are communicated to a scanning/sensing component 360 in the user mode white space service 132 over a separate channel so that the service 132 knows to change channels if a signal is detected (e.g., a wireless MIC appears). This data also may be provided to a spectrum sharing component 362 in the service 132 for sharing this detected information with others. Note that the various components are generally consistent throughout FIG. 1-4, however they may not all be present in each device implementation, e.g., there may not be spectrum sharing and/or scanning/sensing in a given device, such as in FIG. 1.

Note that in order to access the geo-location database 228, for example, a network request needs to be submitted via the Internet such as via TCP/IP (or any other transport layer protocol over IP). This violates the traditional layering in that in order to determine whether a packet can be sent (Layers 1 or 2), a network request (above Layer 3) needs to be issued.

As can be seen, there is provided a network stack that provides the structure and functionality for supports white space networks (in addition to Wi-Fi networks). This includes an architecture that allows flexible and straightforward adaptation to international policies, that allows efficiently accessing a geo-location database, and that enables the device to efficiently access various spectrum availability methods. The technology provides a mechanism/method to quickly discover other white space nodes, a mechanism/method to quickly and seamlessly switch from Wi-Fi to White Space connectivity depending on the current spectrum characteristics, and a mechanism/method to quickly migrate a channel if the currently used channel becomes occupied by a primary licensed user, e.g., television station or wireless microphone.

Exemplary Operating Environment

Figure 5:
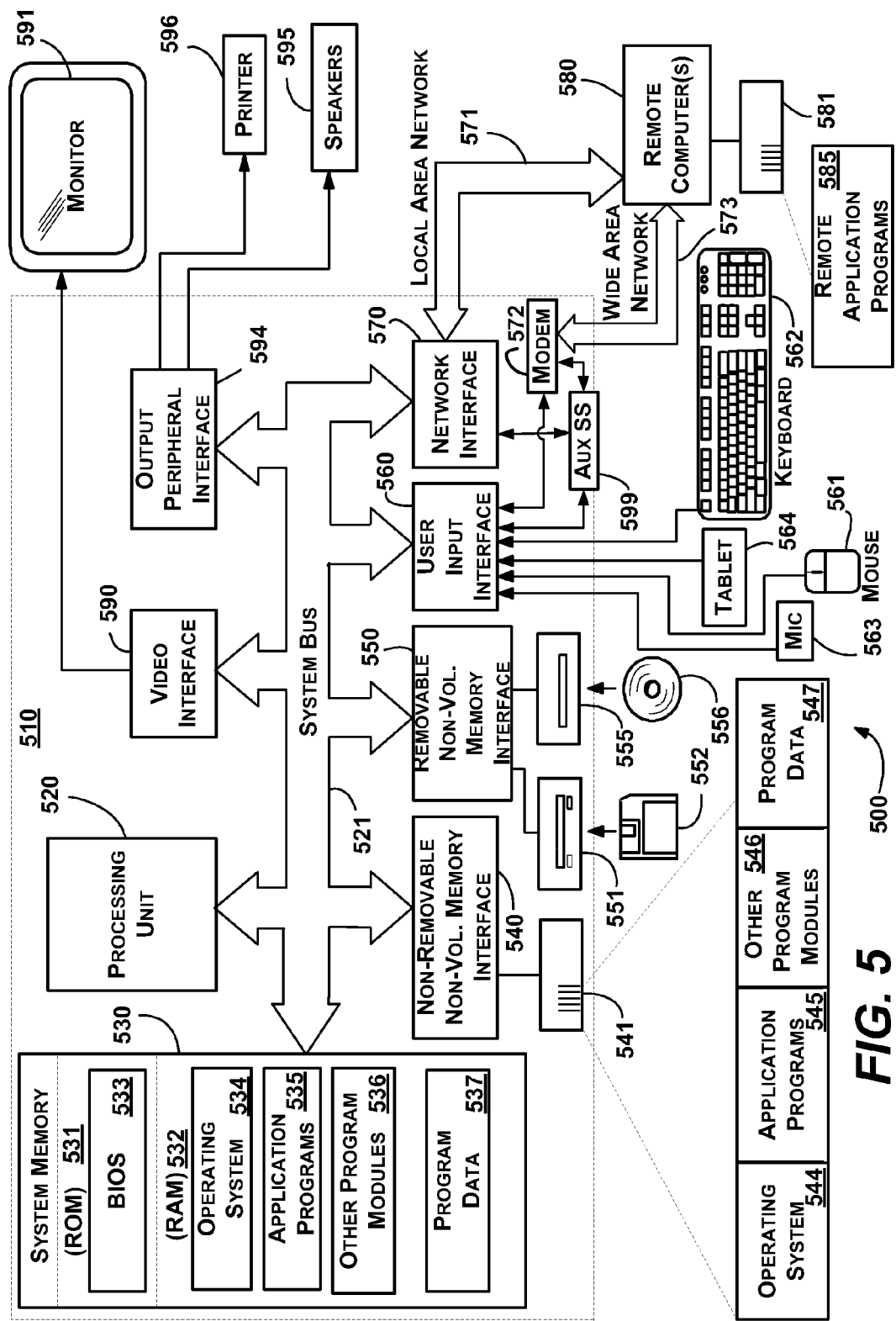
FIG. 5 shows an illustrative example of a computing environment into which various aspects of the present invention may be incorporated.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during startup, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system comprising:
a network stack, including a white space network driver coupled to a hardware driver, the white space network driver configured to control hardware for communication over white space network channels, wherein the network stack includes a channel migration module configured to change from communication on a currently used channel to backup channel when the currently used channel becomes occupied by a licensed user; and
a spectrum access control component configured to determine an available white space channel and communicate channel information to the white space network driver for controlling the currently used channel, wherein the spectrum access control component includes channel availability logic that determines the available network channel based at least in part on a current policy, including whether a channel is available under certain transmission settings.

2. The system of claim 1 wherein the spectrum access control component is configured to communicate the channel information through a white space service, and wherein the white space driver is incorporated into a Network Driver Interface Specification (NDIS) layer.

3. The system of claim 1 wherein the policy module includes a mode-specific operation policy, and channel availability logic that determines the available network channel based at least in part on current operation status mode data and the mode-specific operation policy.

4. The system of claim 1 wherein the spectrum access control component includes one or more spectrum availability modules, each spectrum availability modules configured to determine one or more available channels.

5. The system of claim 4 wherein on of the spectrum availability modules comprises a query database module that communicates with a geo-location database to determine one or more available channels.

6. The system of claim 4 wherein one of the spectrum availability modules comprises a spectrum sharing module that determines one or more available channels by communicating with another network device.

7. The system of claim 4 wherein one of the spectrum availability modules comprises a sensing/scanning module that determines one or more available channels based upon sensed signals whether a licensed user is using a channel.

8. The system of claim 7 further comprising a sharing module that communicates data to at least one other device when a licensed primary user is detected to be using a channel.

9. The system of claim 1 wherein the network stack includes a mechanism for discovering another node.

10. The system of claim 1 wherein the network stack includes a mechanism for automatically switching between Wi-Fi communication and white space network communication.

11. The system of claim 1 wherein the channel migration module is configured to negotiate with another white space device to determine the backup channel in advance of the currently used channel becoming occupied by the licensed user.

12. In a computing environment, a method performed on at least one processor, comprising:
   determining which portion of white space network channels are currently allowed for use in white space network communications, including by evaluating policy data, device operation status data and information that indicates which portion of white space channels are available;
   providing information corresponding to an available portion of a channel to use to a white space driver coupled to a hardware driver, for controlling the portion of the channel that is used as a current channel for white space network communication; and
   negotiating with another white space device to determine another portion of a channel that is available before there is a need for migrating.

13. The method of claim 12 further comprising;
   determining that the current channel is no longer available, and migrating to the other channel that is available.

14. The method of claim 13 further comprising,
   communicating information to other white space devices that indicate that the current channel is no longer allowed for use.

15. The method of claim 12 further comprising;
   switching to Wi-Fi network communication when a Wi-Fi network is accessible, and switching to white space network communication when a Wi-Fi network is not accessible.

16. In a computing environment, a system comprising:
   a network stack, including a spectrum access control component that determines which white space channels are allowed for current use based upon policy, operating status and availability information, and a wireless LAN (WLAN) service, including a white space service having a discovery module that discovers at least one other node for white space communication, and a channel migration module that changes from the current channel to another channel if the current channel is no longer allowed for use wherein the spectrum access control component is configured to comply with one or more policies corresponding to a set of country specific rules; and
   a Network Driver Interface Specification (NDIS) layer white space driver that controls frequency or bandwidth, or both frequency and bandwidth corresponding to a channel to uses as the current channel based upon the availability information received from the white space service.

17. The system of claim 16 wherein the white space driver is incorporated into a Wi-Fi filter driver, and further comprising an automatic configuration module that switches to Wi-Fi network communication when a Wi-Fi network is accessible, and switches to white space network communication when a Wi-Fi network is not accessible.

18. The system of claim 16 wherein the white space driver is configured to receive spectrum sensing data that indicates when the current white space channel is no longer allowed for use, and is further configured to communicate with the white space service to migrate to the other channel.

19. The system of claim 16 wherein the white space service includes a spectrum sharing module that communicates information to another device to indicate that the current white space channel is no longer allowed for use.

* * * * *